United States Patent [19]
White

[11] Patent Number: 4,703,324
[45] Date of Patent: Oct. 27, 1987

[54] SYSTEM IDENTIFICATION IN COMMUNICATIONS SYSTEM

[75] Inventor: Philip D. White, Chessington, England

[73] Assignee: U.S. Philips Corporation, New York, N.Y.

[21] Appl. No.: 940,215

[22] Filed: Dec. 8, 1986

Related U.S. Application Data

[63] Continuation of Ser. No. 539,585, Oct. 6, 1983, abandoned.

[30] Foreign Application Priority Data

Oct. 8, 1982 [GB] United Kingdom ............... 8228886

[51] Int. Cl.$^4$ .......................... H04Q 7/00; H04B 7/00
[52] U.S. Cl. ................................. 340/825.14; 379/61; 455/57; 340/825.72
[58] Field of Search ...................... 340/825.14, 825.44, 340/825.72, 825.64; 379/339, 56, 58, 61–63; 455/11, 89, 51, 56–58

[56] References Cited

U.S. PATENT DOCUMENTS

| | | | |
|---|---|---|---|
| 3,699,522 | 10/1972 | Haner, Jr. ...................... | 340/825.72 |
| 3,823,377 | 7/1974 | Keane et al. ..................... | 370/107 |
| 3,854,011 | 12/1974 | Mallory et al. ..................... | 370/107 |
| 3,962,553 | 6/1976 | Linder et al. ..................... | 455/89 |
| 4,280,222 | 7/1981 | Flower ............................... | 370/107 |
| 4,301,534 | 11/1981 | Genter ............................... | 370/107 |
| 4,398,192 | 8/1983 | Moore et al. ..................... | 340/825.44 |
| 4,422,071 | 12/1983 | de Graaf ......................... | 340/825.44 |
| 4,456,793 | 6/1984 | Baker et al. ..................... | 379/61 |
| 4,471,168 | 9/1984 | Cripps ............................... | 179/2 E |
| 4,535,200 | 8/1985 | Himmelbauer et al. .......... | 179/2 EA |
| 4,539,706 | 9/1985 | Mears et al. ..................... | 455/11 |

FOREIGN PATENT DOCUMENTS 2110055 6/1983 United Kingdom ............... 179/2 E

OTHER PUBLICATIONS

Nachrichten Electronik 3-1980, "Ein Telefon Mit Schnurlosem Hörer", G. Kunde et al, pp. 84;85.

Primary Examiner—Donald J. Yusko
Attorney, Agent, or Firm—Thomas A. Briody; Jack Oisher; William J. Streeter

[57] ABSTRACT

In communications systems, such as cordless telephone systems, in which synchronizing signals are transmitted at predetermined intervals on a signalling channel by base stations to say portable, battery-powered receivers, the need to send separate station identification signals is avoided by the synchronizing signals being transmitted from a base station in accordance with a predetermined signalling sequence, for example a pseudo-random sequence, and the receivers using the sequence as a base station identification signal.

3 Claims, 3 Drawing Figures

SYSTEM IDENTIFICATION IN COMMUNICATIONS SYSTEM

This is a continuation of application Ser. No. 539,585, filed Oct. 6, 1983, now abandoned.

BACKGROUND OF THE INVENTION

1. Field of the Invention

The present invention relates to system identification in radio communications systems such as cordless telephone and radio paging systems.

2. Description of the Related Art

Communications systems will increasingly have to share an environment due to external constraints such as the band of frequencies which are allocated by governmental authorities for certain applications. Where several users are having to share an environment then it is necessary that each user can be distinguished from the others. Hence some form of identification is necessary.

In radio paging, identification signals are frequently transmitted by a base station at regular intervals on a channel allocated for signalling. For paging purposes this channel may be the only channel used by the system or, in more extensive systems, it may be used just for establishing initial contact. In the past these systems have usually been designed with only one base station and in consequence there is no likelihood of clashes between different systems. However, in the case of several communications systems sharing a band of frequencies, clashes may occur if a base station belonging to another user also sends identification signals at the same instants as the first-mentioned base station on the same signalling channel.

A method of avoiding this problem is for each base station sharing a channel to transmit their signalling information at different time intervals together with a base station identification signal. Each base station and each paging receiver associated with that base station has to store these time intervals and the base station identification in order (i) to know when signals are being sent and (ii) to be able to identify the base station.

In radio communications systems such as paging and cordless telephones, the paging receiver and telephone handset are powered by batteries. To extend the life of the batteries when the receiver/handset is on standby the main receiver section may be switched off apart from the intervals when it is signalled. Typically, the signalling of identification and other information may be transmitted for one period in every hundred periods, say 5 mS in 500 mS. Additionally, when a base station is actually calling a receiver/handset then it should be able to convey all the required information as rapidly as possible. However, because of the receiver 1:100 duty cycle it may be necessary to wait for up to one complete interval between signals before any information can be sent. It is therefore desirable to keep this signalling time short. The period for the transmission of the identification and other information is determined by the amount of information which has to be transmitted and hence by reducing the amount of identification information to be transmitted then the overall frequency of the signalling can be increased.

SUMMARY OF THE INVENTION

According to the present invention there is provided a method of identifying a base station in a communications system which is sharing a signalling channel with a base station of at least one other communications system, each base station transmitting signal bursts at time intervals determined in accordance with a respective predetermined sequence, each signal burst transmitted including an indication of the time interval between the sending of the signal and a subsequent signal in the sequence, wherein a receiver determines its base station from the transmitted predetermined sequences and thereby synchronises itself with its associated base station.

By using the predetermined signalling sequence to establish synchronism between the base station and its associated receivers, there is no need to send a separate base station identification signal each time thus enabling the signalling time to be shortened which will lead to a saving in power consumption. A shortening of the means interval between successive signals will in turn lead to a faster response by a receiver when it is being called.

The receiver may compare the actual time intervals between the reception of the signals with an internally stored predetermined sequence and determines whether it is synchronised with its base station on the basis of the matching achieved between the received sequence and the internally stored one. The matching may be done by ascertaining if the time interval between the occurrences of successive signals in the sequence as received corresponds to the time interval in the internally stored sequence for the next signal transmission after the signal transmitted previously.

In an embodiment of the present invention, if the time interval between two successive signal bursts, as received, is in accordance with a predetermined interval in the predetermined sequence, then the receiver adopts its standby mode in which the receiver is switched on at such intervals to receive the signal bursts. However, if there is not an accord between the interval determined and that predetermined in accordance with the predetermined sequence, then this means that the signals are not from the wanted base station. In that case, for an initial period the receiver remains on until a time interval is determined which does agree.

A communications system for carrying out the method in accordance with the present invention comprises a base station including a transmitter, means coupled to the transmitter for producing a synchronizing signal burst including an indication of the position-in-sequence, and coding means for controlling the transmitter so that it transmits successive signal bursts at time intervals determined in accordance with the predetermined code, and a receiver having means for determining its base station from the transmitted predetermined sequences and means for synchronizing itself to the base station.

BRIEF DESCRIPTION OF THE DRAWINGS

The present invention will now be described, by way of example, with reference to the accompanying drawings, wherein.

DESCRIPTION OF THE PREFERRED EMBODIMENTS

The present invention will be described with reference to a cordless telephone system which is operated in an environment where it is sharing a signalling channel with other similar systems. Such an environment may be a large office block wherein different floors have cordless telephone systems which are not compatible with each other but at the same time share the same signalling channel.

The sharing of a signalling channel by a plurality of cordless telephone systems can be acceptable on three conditions:

(1) that each system occupies the available signalling time for the minimum amount, say 1%, of the time.
(2) that each cordless handset is able to identify messages from its own base station, and
(3) that the systems avoid sending signals at the same regular intervals as this might lead to repeated clashing between systems.

Conditions (1) and (3) can be met by each system signalling at predetermined intervals, each system having a different predetermined sequence. Additionally, the signalling can be done at 1% or less of the available signalling time, for example 5 mS in every 500 mS. In order to fulfil condition (2) base station identification information could be put into the signal transmitted by the base station. Such identification information may typically be a 16 bit signal which gives 65,536 possible system identifiers and which at a typical transmission rate of 9.6 kbits/second would require 1.7 mS of signalling which occupies approximately a third of the total time for sending a signal having a format comprising for example:

16 bits preamble for the demodulator to lock on to,
16 bits base station identification,
9 bits of calling information, and
6 bits giving an indication at which time the next signal in the sequence is due, for convenience this is termed the "back-next" signal.

The communications system in accordance with the present invention obviates the need to send a 16 bit base identification information because it is able to determine with a high degree of certainty if the handset is locked onto the correct base station by ascertaining if the time interval between successively occurring signals as received corresponds to that indicated in the back-next signal transmitted in the previous burst or pulse of information. During the initial period when a handset is establishing that it is receiving signals from its base station, it is energised continuously, but once it is satisfied that it has locked on to its base station then it can revert to a mode in which it is only switched on when the next signal from the base station is anticipated. In theory once lock has been achieved between the base station and its handsets the back-next signal is redundant but in practice it is necessary to transmit it in order to maintain synchronisation under all possible operation conditions.

Figure 1:
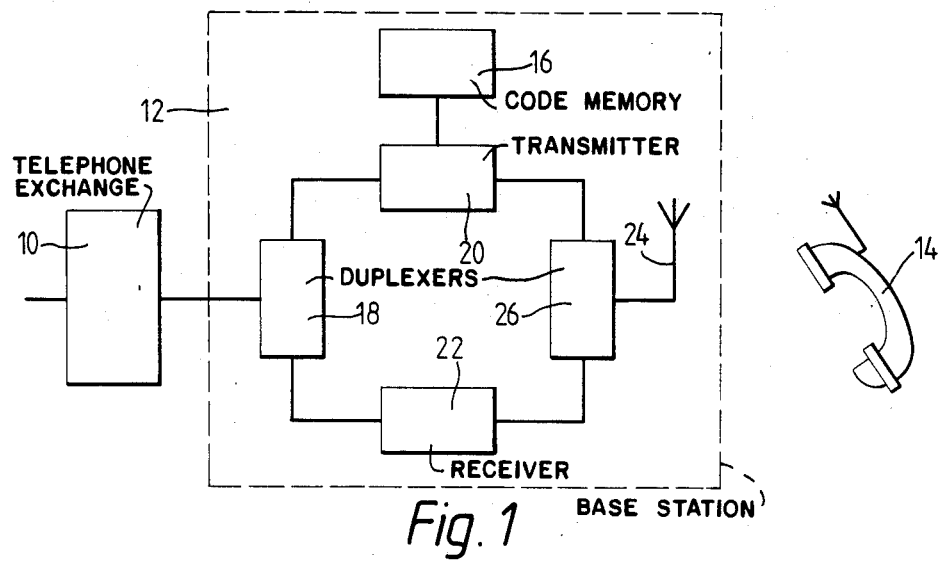
FIG. 1 is a block schematic diagram of an embodiment of a base station of a cordless telephone communications system.

FIG. 1 illustrates block schematically the part of a cordless telephone system in which a conventional telephone exchange 10 is coupled by conventional techniques to a base station 12. Each base station may comprise a single transmitter or several distributed transmitters operating in synchronism or quasi-synchronism. Associated with the base station there may be up to two hundred and fifty battery powered handsets 14 of which only one is shown in FIG. 1. Communication between the base station 12 and the or each handset 14 is by way of a duplex radio link. In operation the base station signals all the handsets at intervals in order to make sure that the system is synchronized. The signalling is done at predetermined intervals so that the battery-powered handsets need only be energised when a signal is expected. In order not to produce too long a delay in a handset being alerted to the fact that it has been addressed, the signalling should take place at least two or three times a second and only last for a few milliseconds otherwise the battery life might be undesirably short. As there could be several separate cordless telephone systems in a large office or industrial complex, then in order to avoid erroneous signalling being made to a handset by a base station of another cordless telephone system each system ascertains to a high degree of confidence if the predetermined signalling sequence which it is receiving corresponds to the distinctive predetermined coding sequence for that system. Thus the predetermined signalling sequence is used for the identification of a base station thus avoiding having to send separate base station identification which will take additional time. In the illustrated embodiment the coding sequence is contained in a code memory embodied as a ROM 16 provided in the base station and in a similar ROM 16' (FIG. 3) is provided in each handset 14 of a system. In order to ensure synchronism between the ROMs they must be clocked at the same rates, for example 9.6 kbits/second. Because of the short range of the radio link between the base station 12 and the handset, the predetermined code need only be unique in a local area but in practice it is desirable that it be unique nationwide so that a system can be installed anywhere.

The base station 12 comprises a duplexer 18 which is connected between the coupling to the telephone exchange 10, a transmitter 20 and a receiver 22. The ROM 16 is connected to the transmitter 20. An antenna 24 is connected to another duplexer 26 which is also connected to the output of the transmitter 20 and the input of the receiver 22.

The transmitter 20 on being energised in accordance with the predetermined timing sequence stored in the ROM 16, transmits a signal which may comprise:

16 bits preamble,
9 bits of calling information, and
6 bits comprising the back-next signal.

If all the 31 bits are sent in series at a rate of 9.6 kbits/second then this will take approximately 3.2 milliseconds to transmit compared to say 5 mS if a base station identification signal were included.

Figure 2:
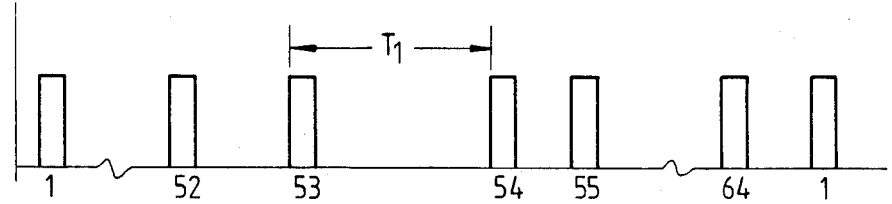
FIG. 2 shows a few pulses, each representative of a burst of information, in a pulse sequence of 64 pulses.

FIG. 2 shows diagrammatically a portion of a signalling pattern which repeats at intervals of 64 pulses. In the present example each of the pulses has a maximum duration of 3.2 milliseconds but the intervals between the commencement of each pulse vary in accordance with the predetermined code, for example a pseudo-random sequence, allocated to that particular cordless telephone system. However, to ensure reasonable battery economy in the handset 14 the mean interval ought to be approximately one hundred times the pulse duration which in this numerical example is 320 milliseconds. Each of the pulses in fact comprises a burst of digital signals including the above-mentioned information.

As mentioned, each handset 14 of a particular cordless telephone system stores the same predetermined signalling pattern as its base station and once a handset 14 is synchronised with its base station 12 then it will turn itself on at the appropriate instant to receive the signals from the base station.

Apparatus for synchronizing the "on" periods of a receiver with a stored or received pulse pattern is well known in the art, and can be achieved simply by means of a counter and conventional associated logic circuits. For example, a received pulse signal may be utilized to set a counter to time-out after an interval corresponding to the period when the next pulse is due, and also to switch-off the receiver. When the counter has timed-out it causes the receiver to switch-on again to receive the next pulse, and upon termination of that pulse the receiver again turns off and resets the counter. The entire process is then repeated. Such a timing arrangement for conserving battery power by switching-off a receiver and then switching it on again when relevant information is expected is described, for example, in cols. 4-5 of U.S. Pat. No. 4,398,192, issued Aug. 9, 1983, on an application filed Dec. 4, 1981.

Figure 3:
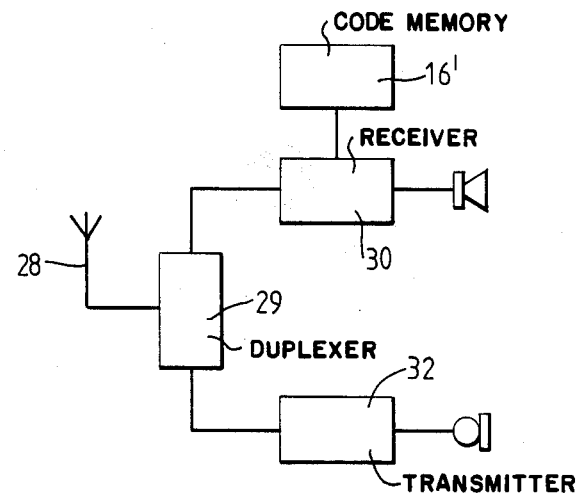
FIG. 3 is a block schematic circuit diagram of an embodiment of a cordless telephone handset.

FIG. 3 shows a block schematic diagram of a handset 14. An antenna 28 is connected to a duplexer 29 to which a receiver 30 and a transmitter 32 are connected. The receiver 30 includes means for separating out the 6 serial bits of the back-next signal. These 6 bits are used to control the receiver and switch on the remainder of the set at the appropriate time ready to receive the next back-next signal from the base station. Provided that the base station 12 and the handset 14 are synchronised, then the handset 14 will be energised at time intervals corresponding to the signalling from the base station and the user of the handset will know with a high degree of confidence that he is locked to his own base station. If there are other cordless telephone system(s) signalling according to different predetermined codes in the range of the present one then repeated conflicts between systems, that is two or more base stations signalling at the same instant because they produce the same back-next signal or one begins signalling whilst the other is part way through its transmission, may occur at infrequent intervals. Nevertheless, the realisation that conflicts may occur should be allowed for in designing the system.

At switch on of a newly installed cordless telephone system or of one that has been shut down, it is necessary for all the handsets to synchronise with its associated base station otherwise they will not be energised at the correct instant. If the predetermined coding for each cordless telephone system operating in the radio reception area of a particular system is different, then merely identifying the predetermined sequence of signalling intervals of a particular base station will be sufficient to identify that base station without the necessity of sending a separate station identification signal. Accordingly, on switching on of the system from a dead start, the handsets 14 are on continuously up to some time limit, say 10 seconds, or until they receive signals from a base station. In this condition, the handsets 14 receive back-next signal from the base station. If the actual time-interval to the next signal does not agree with that anticipated as a result of decoding the previously received back-next signal then the handset remains in the dead start condition until another back-next signal is picked-up and the cycle is repeated. Whenever the expected and actual intervals agree then it can be assumed with a high degree of probability that the handset is in synchronism with its associated base station. To improve the level of confidence the check may be repeated for two or three more time intervals and if these agree then the handset changes to its normal operating condition.

Although in the described embodiment the back-next signal relates to the next-following signal in the sequence, it is possible that the back-next signal will relate to the second or later signal in the sequence and successive back-next signals are processed in parallel with the previously received back-next signals. However, parallel processing has the disadvantages of increasing the circuit complexity.

I claim:

1. A method by which a radio receiver may indentify the base station related thereto in a radio communication system which shares a signaling channel with the base station of at least one other communications system, such method comprising: transmission by each base station of synchronizing signal bursts at time intervals determined in accordance with a predetermined sequence which is different for each base station, each signal burst including an indication of the time interval between transmission thereof and a succeeding signal burst to be transmitted by such base station; reception of such signal bursts by said receiver; comparison in said receiver of the time intervals between reception of sequential signal bursts with a predetermined sequence of time intervals internally stored therein; and synchronization of said receiver with its related base station by matching the time intervals between reception of such sequential signal bursts with the predetermined sequence of time intervals internally stored in said receiver.

2. A method as claimed in claim 1, wherein synchronization of said receiver with its related base station is effected by determining whether the time interval between reception of a signal burst and a succeeding signal burst corresponds to a time interval in the internally stored sequence in said receiver.

3. A method as claimed in claim 1, wherein said receiver may be switched between an on and off condition, and upon being switched to its on condition remains in that condition until it is synchronized with its related base station; the receiver thereafter reverting to its off condition during time intervals between transmission of successive signal bursts by its related base station.

* * * * *